United States Patent
Wang

(10) Patent No.: US 10,359,308 B2
(45) Date of Patent: Jul. 23, 2019

(54) FLOW METER AND A METHOD OF CALIBRATION

(71) Applicant: Natural Gas Solutions North America, LLC, Houston, TX (US)

(72) Inventor: Xuefeng Wang, Niskayuna, NY (US)

(73) Assignee: Natural Gas Solutions North America, LLC, Houston, TX (US)

( * ) Notice: Subject to any disclaimer, the term of this patent is extended or adjusted under 35 U.S.C. 154(b) by 808 days.

(21) Appl. No.: 14/568,264

(22) Filed: Dec. 12, 2014

(65) Prior Publication Data

US 2016/0169730 A1  Jun. 16, 2016

(51) Int. Cl.
*G01F 1/12* (2006.01)
*G01F 25/00* (2006.01)

(52) U.S. Cl.
CPC ...... *G01F 25/0007* (2013.01); *G01F 25/0038* (2013.01)

(58) Field of Classification Search
CPC .. G01F 25/0007; G01F 25/00; G01F 25/0038; G01F 25/0061; G01F 25/0084; G01F 25/0092
USPC ...... 702/100, 48, 12, 282; 73/861, 1.27, 131
See application file for complete search history.

(56) References Cited

U.S. PATENT DOCUMENTS

| | | | |
|---|---|---|---|
| 4,459,858 A * | 7/1984 | Marsh | G01F 1/58 73/861.12 |
| 4,603,257 A | 7/1986 | Packer et al. | |
| 5,353,646 A | 10/1994 | Kolpak | |
| 6,629,455 B2 | 10/2003 | Schrittenlacher et al. | |
| 7,191,645 B2 | 3/2007 | Wible | |

(Continued)

FOREIGN PATENT DOCUMENTS

| | | |
|---|---|---|
| EP | 0465182 A2 | 1/1992 |
| EP | 2080999 A1 | 7/2009 |

(Continued)

OTHER PUBLICATIONS

European Search Report and Opinion issued in connection with corresponding EP Application No. 15197857.4 dated May 23, 2016.

*Primary Examiner* — Connie C Yoha
(74) *Attorney, Agent, or Firm* — Paul Frank + Collins P.C.

(57) ABSTRACT

A system, comprising a first sensor that generates a first output signal representative of a first flow rate measurement in a first flow rate range of a fluid, a second sensor that generates a second output signal representative of a second flow rate measurement in a second flow rate range of the fluid that at least partially overlaps the first flow rate range of the fluid to form a partially overlapping region, a data repository storing a first calibration relationship corresponding to a first condition of the fluid and a second calibration relationship corresponding to a second condition of the fluid, wherein the first calibration relationship and the second calibration relationship correspond to the first sensor, and a processing subsystem that automatically generates a third calibration relationship when the second flow rate measurement falls in the partially overlapping region, wherein the third calibration relationship corresponds to a third condition of the fluid based at least on the first calibration relationship, the second calibration relationship, the first output signal and the second output signal.

16 Claims, 5 Drawing Sheets

(56) References Cited

U.S. PATENT DOCUMENTS

| | | |
|---|---|---|
| 7,201,033 B2 | 4/2007 | Wible |
| 7,387,123 B2 | 6/2008 | De Silva et al. |
| 7,654,151 B2 * | 2/2010 | Agar .................... G01F 1/50 |
| | | 73/861.01 |
| 8,024,146 B2 | 9/2011 | Bey et al. |
| 8,356,623 B2 * | 1/2013 | Isobe .................... G01F 1/6842 |
| | | 137/486 |
| 2003/0233860 A1 | 12/2003 | Deane et al. |
| 2004/0035201 A1 * | 2/2004 | Vincze ................ G01F 1/6845 |
| | | 73/204.11 |
| 2007/0174016 A1 * | 7/2007 | Ding .................... G05D 7/0635 |
| | | 702/100 |
| 2012/0132291 A1 * | 5/2012 | Monkowski ............ F15D 1/025 |
| | | 137/14 |
| 2012/0173169 A1 | 7/2012 | Skelding |
| 2013/0186486 A1 * | 7/2013 | Ding .................... G01F 25/003 |
| | | 137/487 |
| 2013/0340519 A1 | 12/2013 | Kurth et al. |
| 2014/0069206 A1 * | 3/2014 | Ayers .................... G01F 1/588 |
| | | 73/861.12 |
| 2014/0118162 A1 | 5/2014 | Soreefan |
| 2014/0158211 A1 | 6/2014 | Ding et al. |
| 2014/0165718 A1 | 6/2014 | Berkcan et al. |
| 2015/0013474 A1 * | 1/2015 | Patten .................... G01F 1/86 |
| | | 73/861.356 |

FOREIGN PATENT DOCUMENTS

| | | |
|---|---|---|
| WO | 9321501 A1 | 10/1993 |
| WO | 9822784 A1 | 5/1998 |
| WO | 2012078782 A1 | 6/2012 |

* cited by examiner

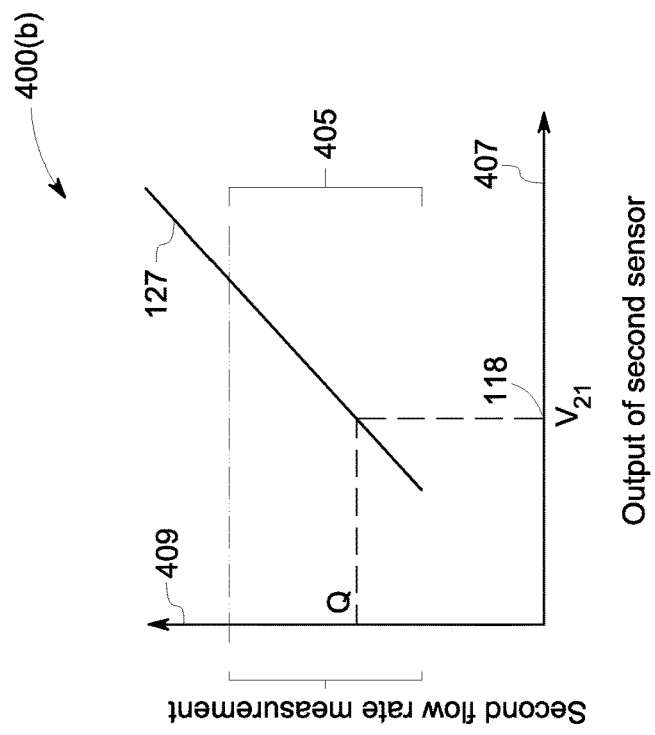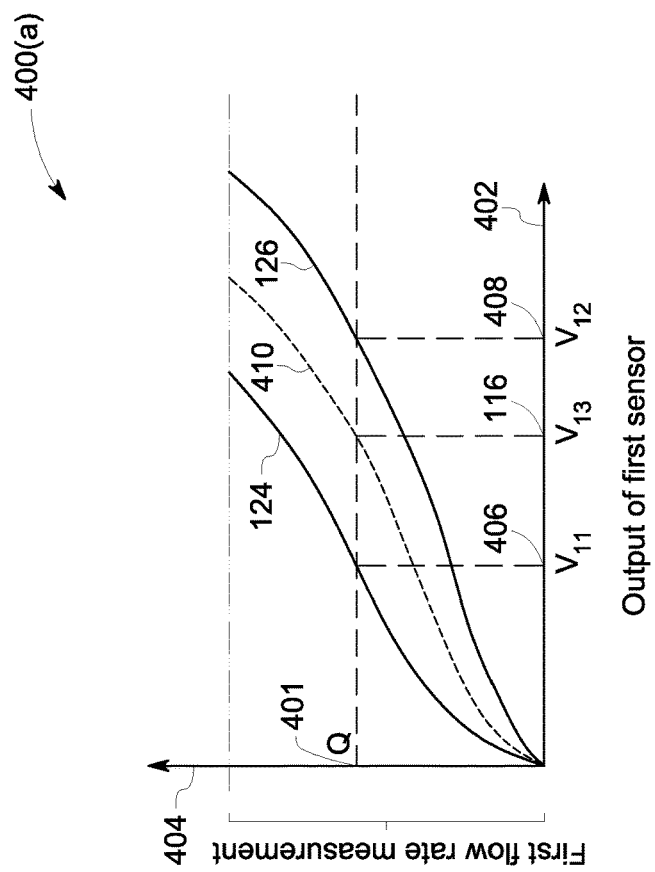

FLOW METER AND A METHOD OF CALIBRATION

BACKGROUND

Various types of flow-meters known in the art, such as thermal or Coriolis flow meters, may provide a mass flow rate measurement (e.g., kilogram/second) of a fluid. Other flow meters may include vortex-based sensing where, for example, the frequency at which the vortices are formed (shed) is essentially proportional to the volumetric flow rate of the fluid.

Mass flow meters typically generate mass flow rate of a fluid, and do not provide a direct volumetric flow rate measurement, and therefore volumetric flow rate may be derived by dividing the mass flow rate by density of the fluid. Consequently, such mass flow-meters, when used for volumetric flow rate measurements, may be adversely affected when a condition of the fluid is uncertain or changes in the field. The condition of the fluid, for example may include unknown gas density fluctuations, temperature fluctuations, gas mixture composition change, etc. On the other hand, vortex-based flow meters may provide a direct volumetric flow rate measurement which is insensitive or less sensitive to certain conditions of the fluid, such as density or composition changes. However vortex based flow meters are often bounded by a lower flow rate measurement limit, below which the fluid velocity is too low or inadequate to form vortices, making vortex based flow rate measurement infeasible.

As described above, a fluid may be characterized by a condition that represents a combination of one or more properties of the fluid. For example, the properties may include a composition of a fluid, a density of the fluid, a temperature of the fluid, a pressure of the fluid, or combinations thereof. For example, when the fluid is natural gas, the natural gas may have different compositions, such as, different proportions of methane, ethane, propane, butane, etc. Typically mass flow meters, known in the art, are factory calibrated based on determined conditions, such as composition, density, temperature, and pressure, of fluid. For example, flow meters (such as the mass flow meters) known in the art are factory calibrated for a determined composition or density of natural gas at standard temperature and pressure.

However, during field measurements, the conditions of the fluid may vary resulting in inaccurate flow rate measurements by flow meters, such as, the mass flow meters. Accordingly, it is desirable to provide cost-effective flow meters that may provide accurate and reliable flow measurements across a wide dynamic range of operation while being substantially impervious to fluctuations and unknown condition variations such as noted above.

BRIEF DESCRIPTION

In accordance with one embodiment, a system is presented. The system includes a first sensor that generates a first output signal representative of a first flow rate measurement in a first flow rate range of a fluid, a second sensor that generates a second output signal representative of a second flow rate measurement in a second flow rate range of the fluid that at least partially overlaps the first flow rate range of the fluid to form a partially overlapping region, a data repository storing a first calibration relationship corresponding to a first condition of the fluid and a second calibration relationship corresponding to a second condition of the fluid, a processing subsystem that automatically generates a third calibration relationship when the second flow rate measurement falls in the partially overlapping region, wherein the third calibration relationship corresponds to a third condition of the fluid based at least on the first calibration relationship and the second calibration relationship, wherein the first sensor is sensitive to variations in condition of the fluid and the second sensor is insensitive or less sensitive to variations in condition of the fluid.

In accordance with another embodiment, a method for in-situ flow rate determination of a fluid in a flow meter is presented. The method includes generating by a first sensor in the flow-meter, a first output signal representative of a first flow rate measurement in a first flow rate range of the fluid, generating by a second sensor in the flow-meter, a second output signal representative of a second flow rate measurement in a second flow rate range that at least partially overlaps the first flow rate range of the fluid, receiving from a data repository, a first calibration relationship corresponding to a first condition of the fluid and a second calibration relationship corresponding to a second condition of the fluid, automatically generating a third calibration relationship corresponding to a third condition of the fluid based at least on the first calibration relationship, the second calibration relationship, and determining a third flow rate corresponding to the third condition of the fluid based on the third calibration relationship and the first output signal or the second output signal.

DRAWINGS

These and other features and aspects of embodiments of the present invention will become better understood when the following detailed description is read with reference to the accompanying drawings in which like characters represent like parts throughout the drawings, wherein:

FIG. 4(a) is plot of a first calibration relationship and a second calibration relationship of a first sensor in connection with determination of a third calibration relationship referred to with reference to FIG. 1-FIG. 3, in accordance with one example;

FIG. 4(b) is a plot of the calibration relationship of a second flow senor, in accordance with one example.

DETAILED DESCRIPTION

Figure 1:
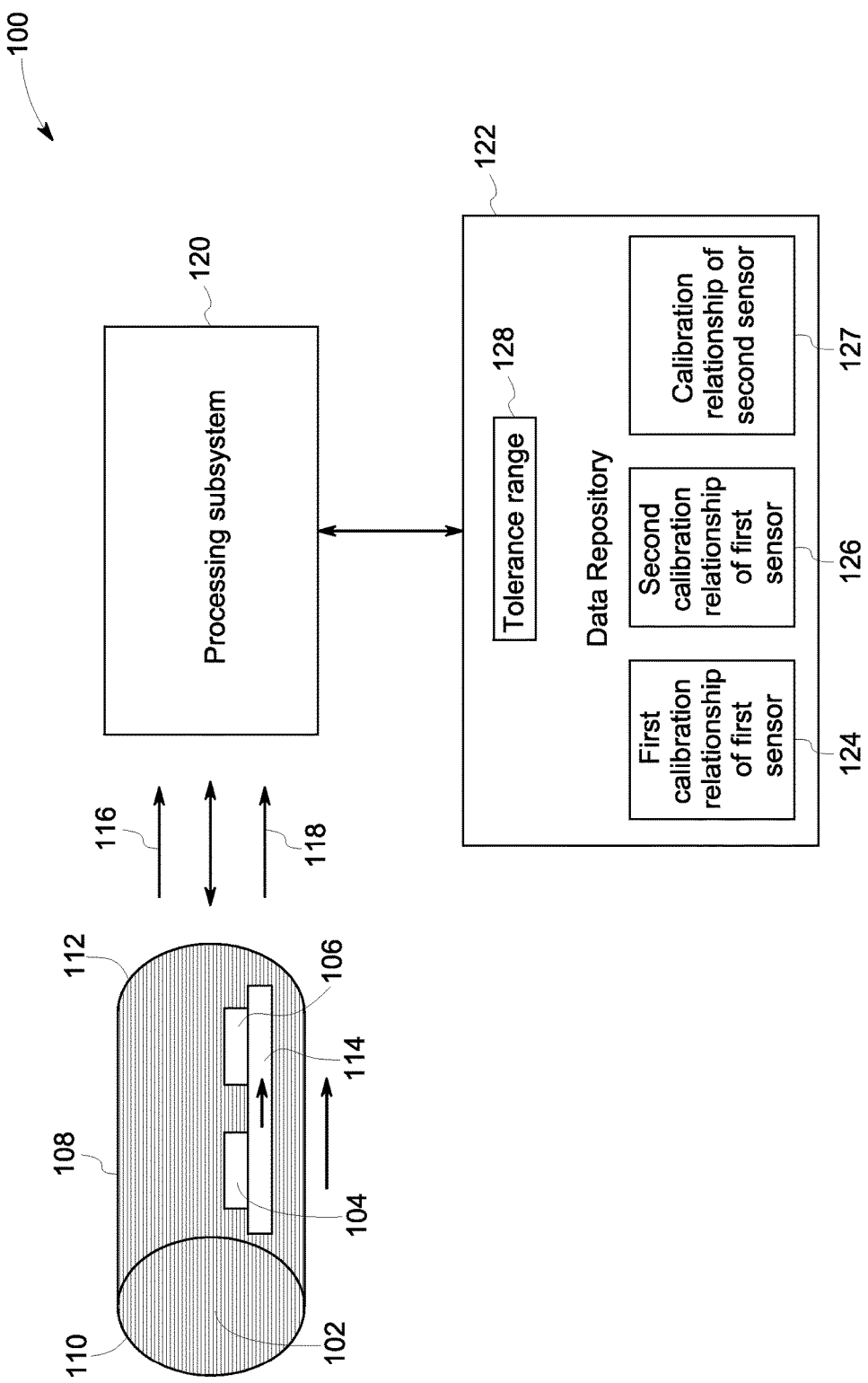
FIG. 1 illustrates schematically a flow-meter system that is capable of automatically self-calibrating and determining a flow rate of a fluid, in accordance with one embodiment.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "processing subsystem", "control system" or "controller" may include either a single component or a plurality of components, which are either active and/or passive and are connected or otherwise coupled together to provide the described function or functions. The term "processing subsystem" may include a digital signal processor, a microprocessor, a microcomputer, a microcontroller, and/or any other suitable device. A 'sensor' may include one or more physical and individual sensing devices/chips, and/or may include a single sensing device/chip comprising two or more sensing mechanisms. A 'sensor' may include a single sensing device/chip that includes two sensing mechanisms wherein one sensing mechanism is capable of measuring volumetric measurements, and another sensing mechanism is capable of measuring mass flow rate measurements.

Flow meters known in the art may not determine accurate flow rates of a fluid due to on-field varying conditions of the fluid. The varying conditions of the fluid, for example may include a variation in at least one or more of the composition of the fluid, the density of the fluid, the temperature of the fluid, the pressure of the fluid, the humidity of the fluid, or combinations thereof. For example, when the fluid is natural gas, existing thermal mass flow meters may not be able to determine accurate volumetric flow rate due to variations in the composition or density of the natural gas.

To overcome the aforementioned inaccuracy induced in the mass flow meters known in the art due to varying flow conditions of the fluid, the present systems and techniques present an on-field calibration method and system. The present systems and techniques determine whether self-calibration of a flow meter is required, and the flow meter automatically self-calibrates when required. As used herein, the term "automatically/automatic" refers to performance of a task without manual intervention or manual control, and is performed by a processing subsystem programmed to perform the task. The present systems and techniques determine substantially accurate flow rates for varying conditions of fluid across a wide flow rate range. The present systems provide a flow meter that includes at least two sensors including a first sensor and a second sensor. Each of the first sensor and the second sensor operates in a respective flow rate range. For example, the first sensor operates in a first flow rate range and the second sensor operates in a second flow rate range. The first flow rate range and the second flow rate range partially overlap. The first sensor may be sensitive to fluid condition variations and therefore requires different calibration relationships for different conditions of the fluid. The second sensor may be insensitive or less sensitive to fluid conditions, and therefore despite variations in fluid conditions the second sensor measures substantially accurate flow rate of the fluid. However, the second sensor does not operate at low flow rates of the fluid, and hence the second sensor cannot be used for measuring low flow rates. The first sensor is factory calibrated in the first flow rate range for pre-determined conditions of the fluid. Furthermore, since the second sensor is insensitive or less sensitive to any fluid condition, the second sensor is factory calibrated in the second flow rate range, and unlike the calibrations of the first sensor, the factory calibration of the second sensor is not related to a condition of the fluid. In field operation, the flow meter automatically self-calibrates the first sensor when the condition of the fluid being metered differs from pre-determined conditions of pre-determined calibrations.

FIG. 1 illustrates schematically a flow-meter system 100 that is capable of determining whether a new calibration is required, and that automatically self-calibrates when the new calibration is required, in accordance with one embodiment. The flow-meter system 100 further determines a flow rate of a fluid 102 based on the new calibration. The fluid 102, for example may be characterized by different conditions. For example, when the fluid 102 is natural gas, the natural gas may have different compositions, such as, different proportions of methane, ethane, propane, etc. In the presently contemplated configuration, the fluid 102 may be characterized by a first condition, a second condition and a third condition. Although for ease of understanding the fluid 102 is described to be characterized by three conditions, the fluid 102 nonetheless may be characterized by more or less than three conditions. The first condition, the second condition and the third condition are different with respect to each other due to a variation in one or more properties of the fluid 102, such as a composition of the fluid 102, a density of the fluid 102, a temperature of the fluid 102, humidity of the fluid 102, or combinations thereof. For example, when the fluid 102 is natural gas, then a first condition of the fluid 102 may be a first composition comprising methane 80%, ethane 15%, and other gases 5%; a second condition of the fluid 102 may be a second composition comprising methane 90%; ethane 5%, and other gases 5%; and a third condition of the fluid 102 may be a third composition comprising ethane 85%, methane 5% and other gases 10%.

The system 100 includes at least one pair of sensors 104, 106 and at least one conduit 108. Each of the sensors 104, 106 is positioned within the conduit 108. The conduit 108 has an upstream opening 110 and a downstream opening 112 that allows the fluid 102 to pass through the conduit 108. The fluid 102 enters the conduit 108 from the upstream opening 110 and leaves the conduit 108 from the downstream opening 112. It should be understood that the terms "upstream" and "downstream" are relative terms that are related to the direction of fluid 102 passing through the conduit 108. Thus, in some embodiments, if the direction of the fluid 102 extends from element 112 to element 110, then element 112 would be the upstream opening and element 110 would be the downstream opening. In one embodiment, the sensors 104, 106 are mounted on a printed circuit board (PCB) 114.

Each of the first sensor 104 and the second sensor 106, for example, may be a sensing device, a transducer, a digital sensor, or the like. The first sensor 104, for example may include a thermopile sensor, a pressure sensor, or the like. In one embodiment, the first sensor 104 is a thermal-based mass flow rate sensor. The second sensor 106, for example may be a vortex-based sensor, an ultrasonic sensor, or the like. In one embodiment, the second sensor 106 may be a volumetric flow sensor.

The first sensor 104 is sensitive to a first flow rate range and the second sensor 106 is sensitive to a second flow rate range of the fluid 102, such that the first flow rate range and the second flow rate range partially overlap in a partially overlapping region. As used herein, the term "partially overlapping region" is used to refer to a flow rate range of the fluid 102 that can be sensed and/or measured by both the first sensor 104 and the second sensor 106. The first sensor 104 may be sensitive to the varying fluid conditions and the second sensor 106 may be insensitive or less sensitive to the varying fluid conditions in their respective flow rate ranges including the first flow rate range and the second flow rate range. In one example, the first flow rate range may include a flow rate of about 0.1 liters/minute to about 20 liters/minute. In the example, the second flow rate range may include a flow rate of about 5 liters/minute to about 50 liters/minute. In the above example, the second sensor 106 may not operate in a flow rate range below 5 liters per minute. Furthermore, in the above examples, the first sensor 104 and the second sensor 106 both operate in the partially overlapping region of about 5 liters/minute to about 20 liters/minute. Furthermore, in the above example, the first flow rate range includes a first non-overlapping range of about 0.1 liters/minute to about 5 liters/minute and a partially overlapping range of about 5 liters/minute to about 20 liters/minute. Furthermore, in the above example, the second flow rate range may include a second non-overlapping flow rate range of about 20 liters/minute to about 50 liters/minute, and the partially overlapping range of about 5 liters/minute to about 20 liters/minute.

In operation, the first sensor 104 and the second sensor 106 sense one or more characteristics of the fluid 102 to simultaneously generate a first output signal 116 and a second output signal 118, respectively. The characteristics, for example, may include a temperature drop or pressure drop along the flow path of the fluid 102, the frequency of vortices formed in the fluid 102, or the like. The first output signal 116 and the second output signal 118, for example, may be electrical signals, such as, voltage or current signals. The first output signal 116 is representative of a first flow rate measurement of the fluid 102 measured by the first sensor 104, and the second output signal 118 is representative of a second flow rate measurement of the fluid 102 measured by the second sensor 106. Although the first output signal 116 and the second output signal 118 are referred to in the singular form, each may represent more than one signal. The first flow rate measurement falls in the first flow rate range of the first sensor 104, and the second flow rate measurement falls in the second flow rate range of the second sensor 106.

In one embodiment, the first sensor 104 is factory calibrated to map potential outputs of the first sensor 104 to respective flow rates for different flow rates of the fluid 102. In the presently contemplated configuration, the first sensor 104 is factory calibrated for a first condition of the fluid 102 and a second condition of the fluid 102. For example, the first sensor 104 may be factory calibrated to generate a first calibration relationship 124 and a second calibration relationship 126. The first calibration relationship 124, for example, may be a table or a function that defines a relationship between the potential outputs of the first sensor 104 to corresponding flow rates of the fluid 102 characterized under the first condition. The second calibration relationship 126, for example, may be a table or a function that defines a relationship between outputs of the first sensor 104 to corresponding flow rates of the fluid 102 characterized under the second condition. It is noted that while in the presently contemplated configuration, the first calibration relationship 124 and the second calibration relationship 126 are generated in factory, in certain embodiments, the first calibration relationship 124 and the second calibration relationship 126 may be generated in field during automated or manual in-situ self-calibration of the system 100 using a process explained further herein. In addition, the second sensor 106 may be factory calibrated to generate a calibration relationship 127, which may be a table or a function that defines a relationship between the potential outputs of the second sensor 106 to corresponding flow rates of the fluid 102 in the second flow rate range.

The system 100 further includes a data repository 122 that stores the first calibration relationship 124 of the first sensor 104 corresponding to the first condition of the fluid 102. Furthermore, the data repository 122 stores the second calibration relationships 126 of the first sensor 104 corresponding to the second condition of the fluid 102. The data repository 122 may store a pre-determined tolerance range 128 that may be accessed by the processing subsystem 120 in determining whether the new calibration is required. Additionally, the data repository 122 stores the calibration relationship 127 of the second sensor 106.

The system 100 further includes a processing subsystem 120 that receives the first output signal 116 and the second output signal 118 from the first sensor 104 and the second sensor 106, respectively. The processing subsystem 120 is programmed to determine the first flow rate measurement and the second flow rate measurement based on the first output signal 116 and the second output signal 118, respectively. Furthermore, the processing subsystem 120 compares the first flow rate measurement measured by the first sensor 104 and the second flow rate measurement measured by the second sensor 106 to determine whether the new calibration is required. When the first flow rate measurement and the second flow rate measurement are substantially similar, then the processing subsystem 120 determines that the new calibration is not required, whereas when the first flow rate measurement and the second flow rate measurement are not substantially similar, then the processing subsystem 120 determines that the new calibration is required. In one embodiment, the first flow rate measurement and the second flow rate measurement are identified as not being substantially similar when a difference between the first flow rate measurement and the second flow rate measurement is beyond the pre-determined tolerance range 128 stored in the data repository 122. In one embodiment, the pre-determined tolerance range may be of about −0.5% to about +0.5% of the second flow rate measurement. The determination as to whether the new calibration is required is explained in greater detail with reference to FIG. 2. Furthermore, the processing subsystem 120 determines whether the second flow rate measurement falls in the partially overlapping region.

When the processing subsystem 120 determines that the second flow rate measurement falls in the partially overlapping region and a new calibration is required, then the processing subsystem 120 receives the first calibration relationship 124 and the second calibration relationship 126 of the first sensor 104 from the data repository 122. Subsequently, the processing subsystem 120 automatically generates a third calibration relationship corresponding to the third condition of the fluid 102 based at least on the first calibration relationship 124, the second calibration relationship 126, the first output signal 116 and the second output signal 118. In one embodiment, the processing subsystem 120 automatically generates the third calibration relationship by applying a linear interpolation technique using at least one of the first calibration relationship 124, and the second calibration relationship 126. The third calibration relationship, for example may be a table or a function that defines a relationship between outputs of the first sensor 104 to corresponding flow rates of the fluid 102 characterized by the third condition. As an example, the three conditions of the fluid 102 may be three different compositions of the natural gas. The automatic generation of the third calibration relationship is explained in greater detail with reference to FIG. 2 and FIG. 3. The processing subsystem 120 further determines a third flow rate corresponding to the third condition of the fluid 102 based on the third calibration relationship and the first output signal 116. In one embodiment, the processing subsystem 120, for example, determines the third flow rate by mapping the first output signal 116 to the corresponding third flow rate when the third calibration relationship is a table. In another embodiment, the processing subsystem 120 determines the third flow rate by substituting a value of the first output signal in the third calibration relationship when the third calibration relationship is a mathematical function (for example a transfer function).

Furthermore, the foregoing examples, demonstrations, and process steps such as those that may be performed by the processing subsystem 120 may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to assembly language, C, C++, Python, or Java. Such code may be stored or adapted for storage on one or more tangible, machine readable media, such as on data repository chips, local or remote hard disks, optical disks (that is, CDs, DVDs, or the like), or other media, which may be accessed by a processor-based system to execute the stored code.

Figure 2:
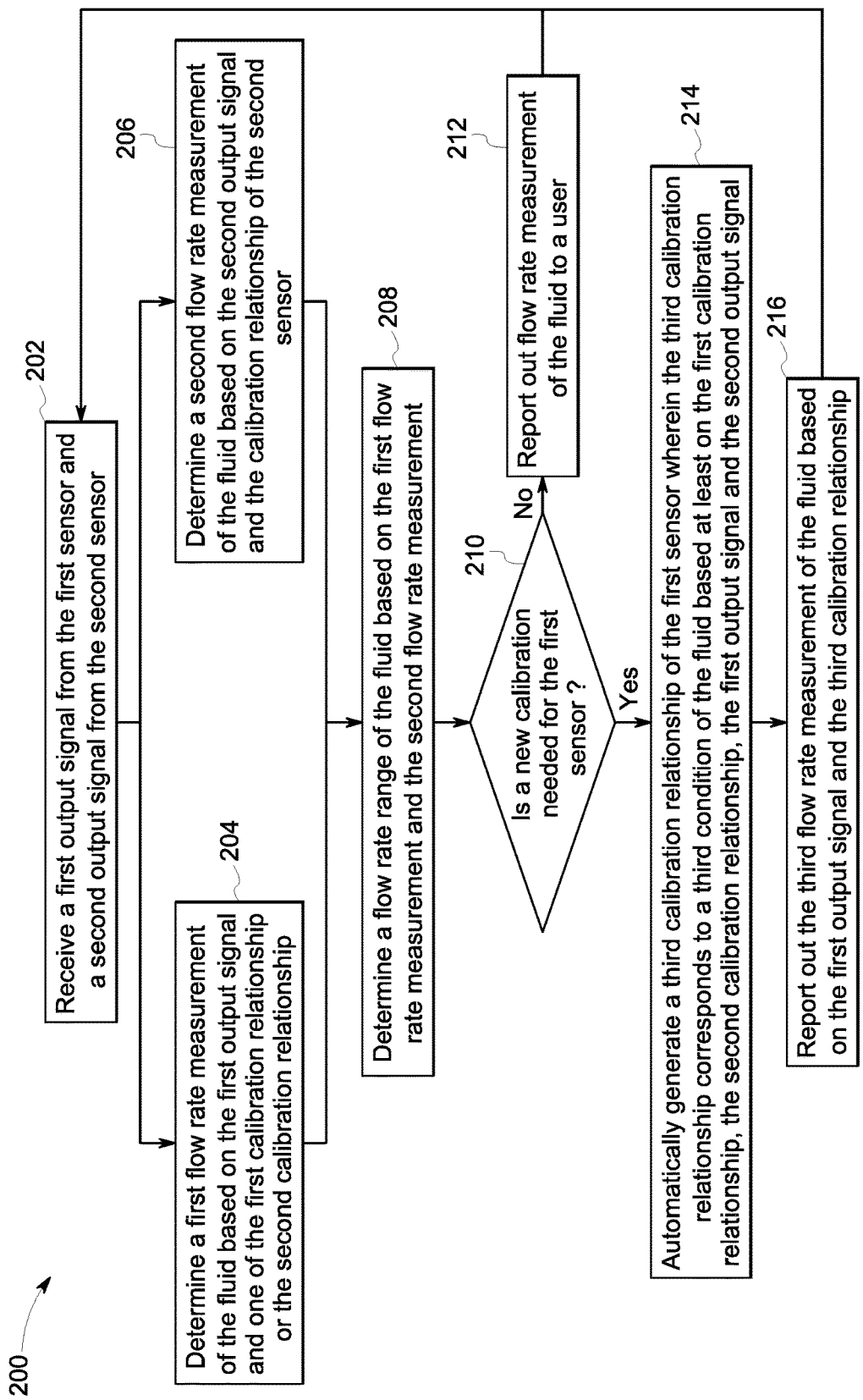
FIG. 2 is a flow chart illustrating a method to self-calibrate and determine a flow rate of a fluid, in accordance with one embodiment.

FIG. 2 is a flow chart illustrating a method 200 to self-calibrate a flow meter and determine a flow rate of the fluid 102 referred to in FIG. 1, in accordance with one embodiment. At block 202, the first output signal 116 measured by the first sensor 104 and the second output signal 118 measured by the second sensor 106 are received. As previously noted with reference to FIG. 1, the first sensor may be sensitive to fluid condition variation (therefore results in substantially inaccurate flow rate measurements with fluid condition variations) and operates in the first flow rate range of the fluid 102, and the second sensor 106 may be insensitive or less sensitive to fluid condition variation (therefore results in substantially accurate flow rate measurements irrespective of fluid condition variations) and operates in the second flow rate range of the fluid 102. The first flow rate range and the second flow rate range may overlap in a partially overlapping region, and therefore the first flow rate measurement and the second flow rate measurement may together fall in the partially overlapping region. For example, when the first flow rate range starts at about 0.1 liters per minute and ends at about 20 liters per minute, and the second flow rate range starts at about 5 liters per minute and ends at about 50 liters per minute, then the first flow rate range and the second flow rate range overlap in a partially overlapping region starting at about 5 liters per minute and ending at about 20 liters per minute. The first output signal 116 and the second output signal 118 may be received by the processing subsystem 122 referred to in FIG. 1. After reception of the first and second output signals 116, 118 from first and the second sensors 104, 106, at block 204 a first flow rate measurement may be determined based on the first output signal 116 and the first calibration relationship 124 or the second calibration relationship 126 of the first sensor 104, and at block 206 a second flow rate measurement may be determined based on the second output signal 118 and the calibration relationship 127 of the second sensor 106.

At block 208, a flow rate range of the fluid 102 may be determined based on the first flow rate measurement measured by first sensor 104 and the second flow rate measurement measured by the second sensor 106. The flow rate range of the fluid, for example, may include the first non-overlapping flow rate range of the first sensor 104, the second non-overlapping flow rate range of the second sensor 106, or the partially overlapping region of the first sensor 104 and the second sensor 106 referred to in FIG. 1. At block 210, a check is carried out to determine whether a new calibration of the first sensor 104 is required. The requirement of the new calibration is determined based on the first flow rate measurement 204 and the second flow rate measurement 206. The determination of the requirement of the new calibration is explained in greater detail with reference to FIG. 5. When it is determined that the new calibration of the first sensor 104 is not required, the control is transferred to block 212.

At block 212, the first flow rate measurement or the second flow rate measurement is reported out to a user based on the flow rate range. For example, when the flow rate range is determined to be the first non-overlapping flow rate range of the first sensor 104, then the first flow rate measurement measured by the first sensor 104 is reported out as a flow rate of the fluid 102 to the user. Similarly, when the flow rate range is determined to be the second non-overlapping flow rate range, then the second flow rate measurement measured by the second sensor 106 is reported out as the flow rate of the fluid 102 to the user. Furthermore, when the flow rate range is determined to be the partially overlapping range, then the second flow rate measurement measured by the second sensor 102 is reported out as the flow rate of the fluid 102 to the user.

Referring back to block 210, when it is determined that a new calibration is required for the first sensor 104, then the control is transferred to block 214. At block 214, a third calibration relationship corresponding to the third condition of the fluid is automatically generated based on the first calibration relationship 124, the second calibration relationship of the first sensor 104 (see FIG. 1), the first output signal 116 and the second output signal 118. In one embodiment, the third calibration relationship is generated by applying a linear interpolation technique at least on the first calibration relationship 124 and the second calibration relationship 126. The third calibration relationship, for example may be a table or a function that defines a relationship between various outputs of the first sensor 104 (see FIG. 1) and corresponding flow rates of the fluid 102 when the fluid 102 is characterized by the third condition. Determination of the third calibration relationship is explained in greater detail with reference to FIG. 3. In one embodiment, the third calibration relationship is saved in the data repository 122 (see FIG. 1) as a current calibration relationship for the first sensor 104.

At block 216, a third flow rate of the fluid 102, characterized by the third condition, is determined based on the first output signal 116 and the third calibration relationship. In one embodiment, when the third calibration relationship is a function, the third flow rate is determined by substituting a value of the first output signal 116 into the function. In another embodiment, when the third calibration relationship is a table, the third flow rate is determined by mapping a value of the first output signal 116 to the corresponding third flow rate. After reporting the third flow rate, blocks 202-216 may be repeated to determine subsequent new calibration relationships.

Figure 3:
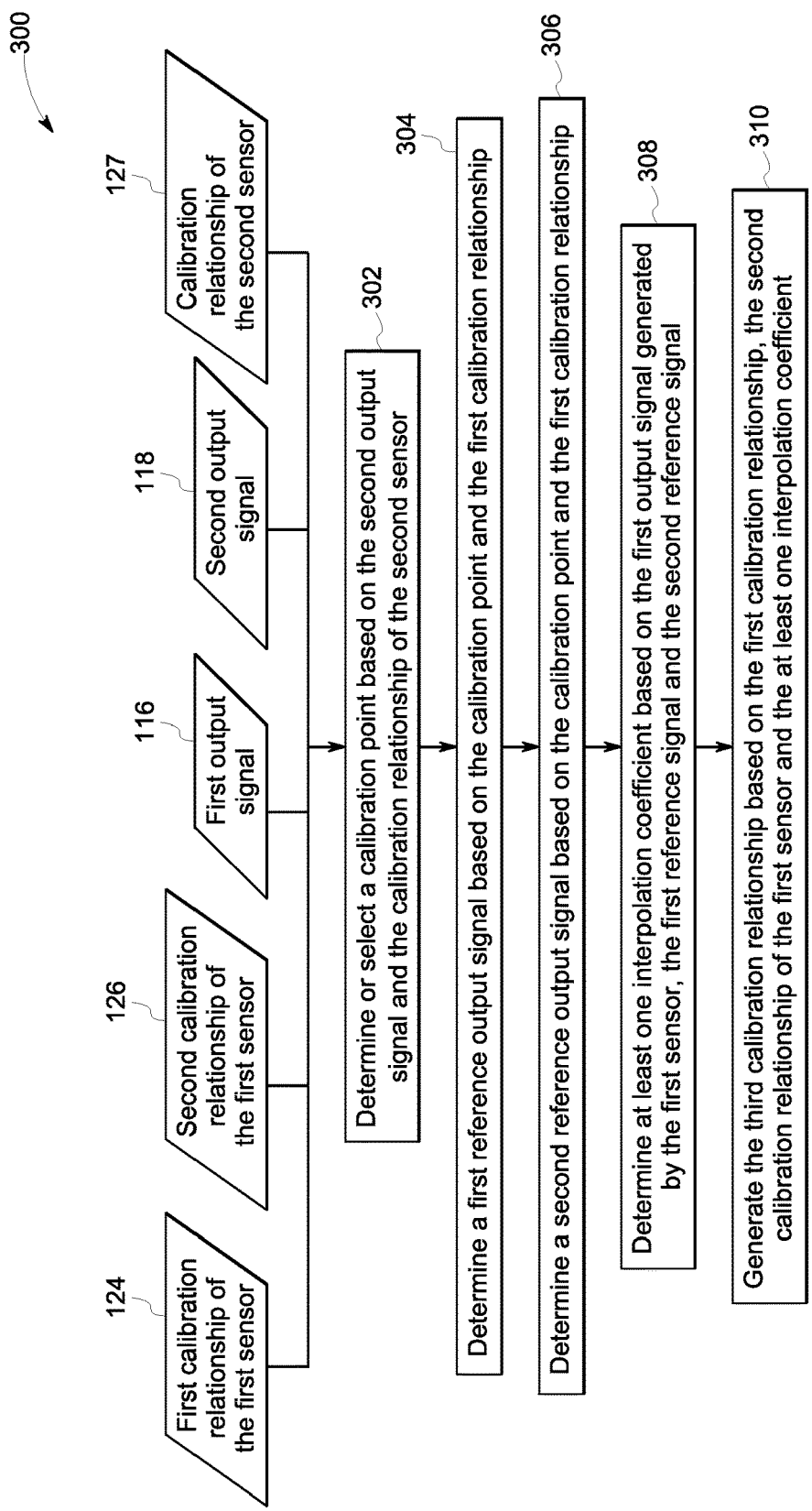
FIG. 3 is a flow chart illustrating a method to automatically generate a third calibration relationship, in accordance with one embodiment.

FIG. 3 is a flow chart illustrating a method 300 to automatically generate the third calibration relationship referred to in FIG. 1 and FIG. 2, in accordance with one embodiment of the present techniques. In one embodiment, FIG. 3 represents block 214 of FIG. 2 in greater detail. As previously noted with reference to FIG. 1, reference numeral 124 is representative of the first calibration relationship $f_{11}$ of the first sensor 104, reference numeral 126 is representative of the second calibration relationship $f_{12}$ of the first sensor 106, reference numeral 116 is representative of the first output signal generated by the first sensor 104, and reference numeral 118 is representative of the second output signal generated by the second sensor 106, and reference numeral 127 is representative of the calibration relationship of the second sensor 106.

At block 302, a calibration point may be selected or determined As used herein, the term "calibration point" or "calibration region" is used to refer to one or more flow rates that fall in the partially overlapping region of the first sensor 104 and the second sensor 106. In one embodiment, the calibration point is a pre-determined flow rate that falls in the partially overlapping region, and is preset during or before commissioning of the system 100 (see FIG. 1). In one embodiment, the calibration point may be stored in the data repository 122 (see FIG. 1). In another embodiment, the calibration point 301 may be selected in real-time by a user or the system 100. In still another embodiment, the calibration point is determined based on the second output signal 118 and the calibration relationship 127 of the second sensor 106. Determination of the calibration point in accordance with one embodiment is explained in greater detail with reference to FIG. 4(*a*) and FIG. 4(*b*).

At block 304, a first reference output signal based on the calibration point and the first calibration relationship 124 is determined Determination of the first reference output signal in accordance with one embodiment is shown with reference to FIG. 4(*a*). Furthermore, at block 306, a second reference output signal may be determined based on the calibration point and the second calibration relationship 126. Determination of the first reference output signal and the second reference output signal in accordance with an example is shown with reference to FIG. 4(*a*). Subsequently, at block 308, one or more interpolation coefficients may be determined based on the first output signal 116, the first reference output signal and the second reference output signal. The interpolation coefficient, for example, may be greater than or equal to zero and less than or equal to one. In one embodiment, an interpolation coefficient may be determined based on proximity of the first output signal 116 from the first reference output signal and the second reference output signal. An interpolation coefficient, for example, may be determined based on the first output signal 116, the first reference output signal 406 and the second reference output signal 408 using the following equation:

$$c = \frac{|V_{13} - V_{11}|}{|V_{12} - V_{11}|} \quad (1)$$

wherein c is an interpolation coefficient, $V_{13}$ is the first output signal, $V_{11}$ is the first reference signal 406 and $V_{12}$ is the second reference signal 408. At block 310, the third calibration relationship is generated by applying a linear or non-linear interpolation function at least on the first calibration relationship 124, the second calibration relationship 126 and the interpolation coefficient. In one embodiment, the third calibration relationship may be determined using the following equation:

$$f_{13} = (1-c)f_{11} + cf_{12} \quad (2)$$

wherein $f_{13}$ is the third calibration relationship of the first sensor 104, $f_{11}$ is the first calibration relationship 124 of the first sensor 104, $f_{12}$ is the second calibration relationship 126 of the first sensor 106, c is the interpolation coefficient determined in equation (1). In another embodiment, a third calibration relationship, for example, may be determined using the following equation:

$$f_{13} = c_1 f_{11} + c_2 f_1 \quad (3)$$

wherein $f_{13}$ is the third calibration relationship of the first sensor 104, $f_{11}$ is the first calibration relationship 124 of the first sensor 104, $f_{12}$ is the second calibration relationship 126 of the first sensor 106, $c_1$ is an interpolation coefficient and $c_2$ is another interpolation coefficient. In another embodiment, the new calibration relationship $f_{13}$ may be determined using a nonlinear interpolation function:

$$f_{13} = c_1 f_{11}^2 + c_2 f_{12}^2 \quad (4)$$

FIG. 4(*a*) is plot 400(*a*) of the first calibration relationship 124 and the second calibration relationship 126 of the first sensor 104 in connection with determination of the third calibration relationship referred to with reference to FIG. 1-FIG. 3, in accordance with one embodiment. Furthermore, FIG. 4(*b*) is a plot 400(*b*) of the calibration relationship 127 of the second sensor 106. In FIG. 4(*a*), reference numeral 402 is representative of outputs (e.g. the first output signal 116) of the first sensor 104 and reference numeral 404 is representative of first flow rates determined based on the outputs of the first sensor 104. As previously noted with reference to FIG. 1, the reference numeral 124 shows the first calibration relationship of the first sensor 104, the reference numeral 126 shows the second calibration relationship of the first sensor 104, the reference numeral 116 represents the first output signal in voltage $V_{13}$, the reference numeral 118 represents the second output signal in voltage $V_{21}$.

In FIG. 4(*b*), reference numeral 407 is representative of outputs (e.g. the second output signal 118) measured by the second sensor 106, and reference numeral 409 is representative of second flow rates determined based on outputs of the second sensor 106. Furthermore, in FIG. 4(*a*) and FIG. 4(*b*), reference numeral 405 represents the partially overlapping region of the first sensor 104 and the second sensor 106. In the presently contemplated configuration, the processing subsystem 120 determines a calibration point 401 based on the second output signal 118 (in voltage $V_{21}$) and the calibration relationship 127 of the second sensor 106. Particularly, the processing subsystem 120 maps the second output signal 116 to a corresponding flow rate based on the calibration relationship 127, and determines the corresponding flow rate as the calibration point 401.

Subsequently, the processing subsystem 120 determines a first reference output signal 406 ($V_{11}$ in voltage) based on the calibration point 401 and the first calibration relationship 124. Particularly, the processing subsystem 120 maps the calibration point 401 to the first reference output signal 406 using the first calibration relationship 124. Furthermore, the processing subsystem 120 determines a second reference output signal 408 ($V_{12}$ in voltage) based on the calibration point 401 and the second calibration relationship 126. Particularly, the processing subsystem 120 maps the calibration point 401 to the second reference output signal 408 using the second calibration relationship 124.

Subsequently, the processing subsystem 120 may determine one or more interpolation coefficients based on the first output signal 116, the first reference output signal 406 and the second reference output signal 408. Subsequent to the determination of the one or more interpolation coefficient(s), a third calibration relationship 410 is determined by applying a linear or non-linear interpolation function on the first calibration relationship 124, the second calibration relationship 126 and the one or more interpolation coefficients. It is noted that while two calibration relationships (124, 126) of the first sensor 104 are mentioned with reference to FIG. 1 to FIG. 4, however the present systems and methods are applicable when two or more calibration relationships of the first sensor 104 are available and/or stored in the data repository 122.

Figure 5:
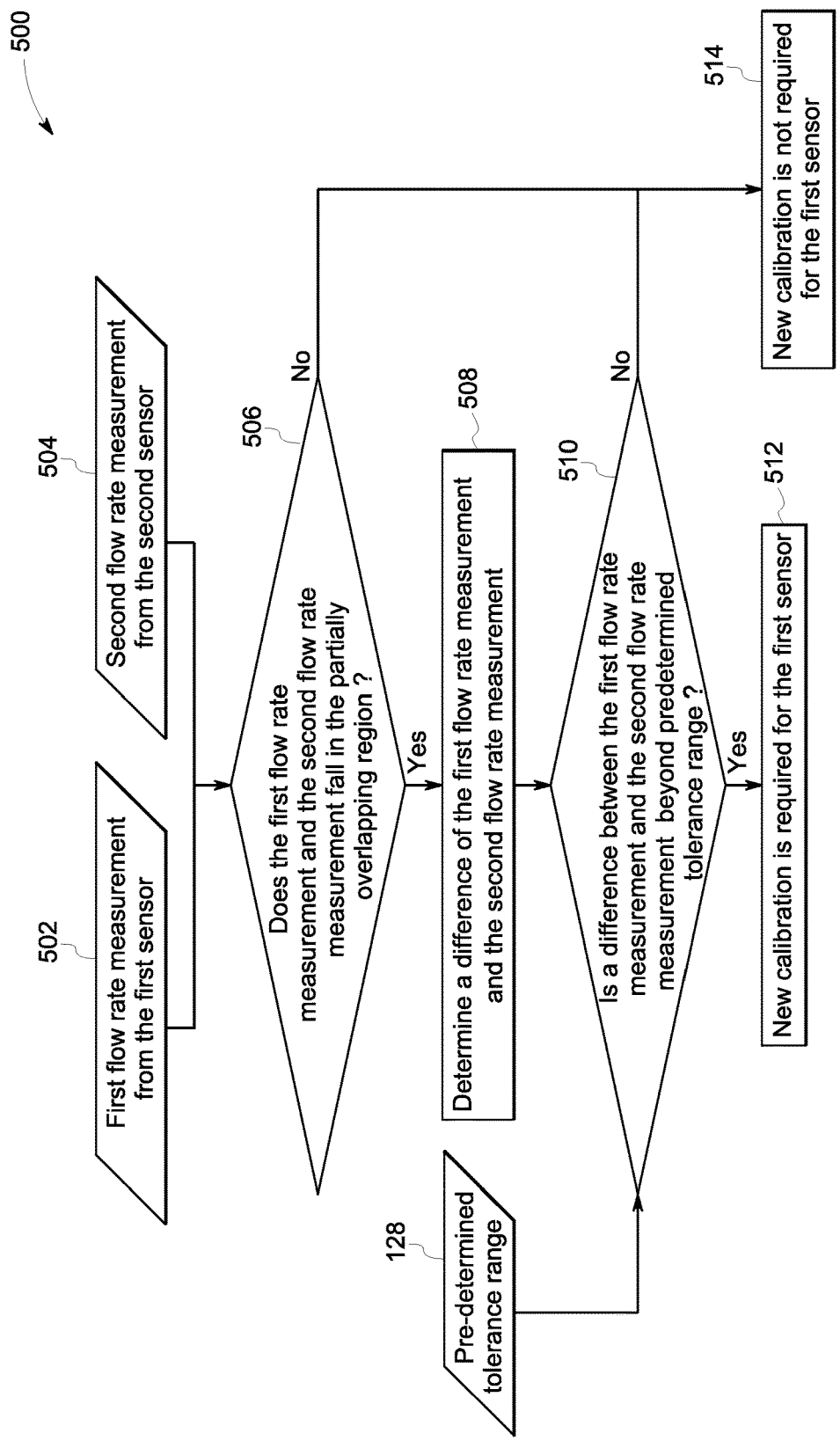
FIG. 5 is a flow chart illustrating a method to determine requirement of a new calibration, in accordance with one embodiment.

FIG. 5 is a flow chart illustrating a method to 500 to determine requirement of a new calibration, in accordance with one embodiment. In one embodiment, FIG. 5 represents block 210 of FIG. 2 in greater detail. Reference numeral 502 is representative of the first flow rate measurement determined at block 204 of FIG. 2, and reference numeral 206 is representative of the second flow rate measurement determined at block 206 of FIG. 2. Furthermore, as previously noted with reference to FIG. 1, reference numeral 128 is representative of the pre-determined tolerance range stored in the data repository 122. At block 506, a check is carried out to determine whether the first flow rate measurement 502 and the second flow rate measurement 504 fall in the partially overlapping region. When it is determined that that the first flow rate measurement 502 and the second flow rate measurement 504 do not fall in the partially overlapping region, then the control is transferred to block 514 where it is determined that the new calibration of the first sensor 104 is not required. However, when it is determined that the first flow rate measurement 502 and the second flow rate measurement 504 fall in the partially overlapping region, then the control is transferred to block 508.

At block 508, a difference between the first flow rate measurement 502 and the second flow rate measurement 504 is determined At block 508, the difference between the first flow rate 204 and the second flow rate measurement 206 is compared to the pre-determined tolerance range 128. When the difference is beyond the pre-determined tolerance range 128, at block 512 it is determined that a new calibration is required for the first sensor 104. When the difference is not beyond the pre-determined tolerance range 128, at block 514 it is determined that a new calibration is not required.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a conduit configured to receive a flow of fluid;
   a first sensor positioned within the conduit, the first sensor adapted to generate a first output electrical signal representative of a first flow rate measurement in a first flow rate range of the fluid;
   a second sensor positioned within the conduit and spaced longitudinally from and downstream of the first sensor along an axis of the conduit, the second sensor adapted to generate a second output electrical signal representative of a second flow rate measurement in a second flow rate range of the fluid;
   a data repository configured to store a factory calibration for the first sensor as a first calibration relationship corresponding to a first condition of the fluid and a second calibration relationship corresponding to a second condition of the fluid, wherein the first calibration relationship and the second calibration relationship define the first output electrical signal of the first sensor; and
   a processing subsystem coupled with the data repository and the sensors, the processing subsystem operative to process the first output electrical signal and the second output electrical signal to adjust the factory calibration of the first sensor in response to conditions of the fluid by,
      detecting an overlap between the first flow rate measurement and the second flow rate measurement;
      automatically generating a third calibration relationship in response to the overlap, wherein the third calibration relationship corresponds to a third condition of the fluid that corresponds with the first calibration relationship, the second calibration relationship, the first output electrical signal, and the second output electrical signal; and
      automatically updating the data repository to replace the factory calibration for the first sensor with the third calibration so that the first output electrical signal corresponds with a third flow rate of the fluid characterized by the third condition.

2. The system of claim 1, wherein the processing subsystem further configured to determine the third flow rate corresponding to the third condition of the fluid based on the third calibration relationship and the first output electrical signal of the first sensor.

3. The system of claim 1, wherein each of the first condition, the second condition and the third condition comprises a composition of the fluid, a density of the fluid, a temperature of the fluid, humidity of the fluid, or combinations thereof.

4. The system of claim 3, wherein the first condition, the second condition and the third condition of the fluid differ from each other due to a variation in at least one or more of the composition of the fluid, the density of the fluid, the temperature of the fluid, the humidity of the fluid, or combinations thereof.

5. The system of claim 1, wherein the processing subsystem generates the third calibration relationship upon determining a requirement for generation of the third calibration relationship based on the first flow rate measurement and the second flow rate measurement of the fluid.

6. The system of claim 5, wherein the processing subsystem determines the requirement for generation of the third calibration relationship by:
   determining a difference between the first flow rate measurement generated by the first sensor and the second flow rate measurement simultaneously generated by the second sensor; and
   determining the requirement for generation of the third calibration relationship when the difference between the first flow rate measurement and the second flow rate measurement is beyond a tolerance range.

7. The system of claim 1, wherein the first calibration relationship, the second calibration relationship and the third calibration relationship define a relationship between a plurality of output values of the first sensor and a plurality of flow rates of the fluid for three different conditions of the fluid, wherein the plurality of output values comprise the first output electrical signal.

8. The system of claim 1, wherein the processing subsystem automatically generates the third calibration relationship by:
   determining a calibration point based on the second output electrical signal generated by the second sensor and a calibration relationship corresponding to the second sensor;
   determining a first reference output signal based on the calibration point and the first calibration relationship corresponding to the first sensor;

determining a second reference output signal based on the calibration point and the second calibration relationship corresponding to the first sensor;

determining at least one interpolation coefficient based on the first reference output signal, the second reference output signal and the first output electrical signal; and generating the third calibration relationship by applying an interpolation function at least on the first calibration relationship, the second calibration relationship and the at least one interpolation coefficient.

9. The system of claim 8, wherein the processing subsystem generates the third calibration relationship by applying a linear or a non-linear interpolation function on the first calibration relationship and the second calibration relationship using the at least one interpolation coefficient.

10. The system of claim 1, wherein the second sensor operates in the second flow rate range of the fluid comprising about 5 liters per minute to about 50 liters per minute.

11. The system of claim 1, wherein the first sensor operates in the first flow rate range comprising about 0.1 liters per minute to about 20 liters per minute.

12. The system of claim 1, wherein the first sensor and the second sensor simultaneously generate the first output electrical signal and the second output electrical signal.

13. The system of claim 1, wherein the first sensor comprises a thermal sensor, a Coriolis sensor, or a pressure sensor.

14. The system of claim 1, wherein the second sensor comprises a vortex based sensor, or an ultrasonic sensor.

15. The system of claim 1, wherein the first sensor is factory calibrated to generate the first calibration relationship that maps outputs of the first sensor to respective flow rates of the fluid characterized by the first condition.

16. The system of claim 1, wherein the first sensor is calibrated in the factory to generate the second calibration relationship that maps outputs of the first sensor to respective flow rates of the fluid characterized by the second condition.

* * * * *